US007285749B2

(12) United States Patent
Woods et al.

(10) Patent No.: US 7,285,749 B2
(45) Date of Patent: Oct. 23, 2007

(54) THERMOPLASTIC TUBE SEALING DEVICE UTILIZING ACTUATORS TO CONTROL SEPARATE HEATING AND COOLING STATIONS

(75) Inventors: Elmer B. Woods, West Bend, WI (US); Bruce A. Bliefnick, Fond du Lac, WI (US); Robert M. Slemin, Ixonia, WI (US)

(73) Assignee: PDC Facilities, Inc., Hartland, WI (US)

( * ) Notice: Subject to any disclaimer, the term of this patent is extended or adjusted under 35 U.S.C. 154(b) by 0 days.

(21) Appl. No.: 11/186,319

(22) Filed: Jul. 20, 2005

(65) Prior Publication Data
US 2006/0018989 A1 Jan. 26, 2006

Related U.S. Application Data

(60) Provisional application No. 60/590,123, filed on Jul. 22, 2004.

(51) Int. Cl.
*H05B 1/00* (2006.01)
*B65B 51/32* (2006.01)
(52) U.S. Cl. ............... 219/243; 219/244; 219/472; 156/304.2; 156/311; 156/538
(58) Field of Classification Search ................ 219/243, 219/244, 472; 156/498, 583.1, 538, 311, 156/304.2
See application file for complete search history.

(56) References Cited

U.S. PATENT DOCUMENTS 3,063,890 A * 11/1962 Saumsiegle ............. 156/308.4
3,332,204 A * 7/1967 Frank ....................... 53/374.9
3,632,943 A 1/1972 Engler et al.
3,692,608 A * 9/1972 Risgaard .................. 156/282
4,117,647 A 10/1978 Rossi (Continued)

FOREIGN PATENT DOCUMENTS

EP 0 661 209 7/1995

OTHER PUBLICATIONS

Wave Biotech LLC, Sterile Tube Fuser & Hot Lips Tube Sealer® Mini Catalog; http://www.wavebiotech.com; dated Jul. 2003 (7 pages).

(Continued)

*Primary Examiner*—Tu Ba Hoang
*Assistant Examiner*—Stephen J. Ralis
(74) *Attorney, Agent, or Firm*—Michael Best & Friedrich LLP

(57) ABSTRACT

A tube sealing device for sealing a resilient thermoplastic tube. The tube sealing device includes a base that supports a resilient thermoplastic tube in a fixed position relative to the base. The heating tool and the cooling tool are coupled to the base for movement relative to each other. Relative movement between the heating tool and the base aligns the heating tool with a portion of the resilient thermoplastic tube. The heating tool operates to contact, pinch and heat the portion of the resilient thermoplastic tube. Relative movement between the cooling tool and the base aligns the cooling tool with the same portion of the resilient thermoplastic tube. The cooling tool operates to contact, pinch and cool the resilient thermoplastic tube to form a seal.

4 Claims, 16 Drawing Sheets

U.S. PATENT DOCUMENTS

| | | | |
|---|---|---|---|
| 4,362,593 A * | 12/1982 | Grevich | 156/498 |
| 4,384,186 A | 5/1983 | Burt | |
| 4,412,835 A * | 11/1983 | Spencer | 604/29 |
| 4,490,598 A * | 12/1984 | Minney et al. | 219/769 |
| 4,529,859 A | 7/1985 | Minney et al. | |
| 4,630,429 A | 12/1986 | Christine | |
| 4,656,818 A | 4/1987 | Shimoyama et al. | |
| 4,662,978 A | 5/1987 | Oki | |
| 4,753,697 A * | 6/1988 | Shaposka et al. | 156/158 |
| 4,795,524 A * | 1/1989 | Sakaida et al. | 156/498 |
| 4,861,414 A * | 8/1989 | Vogan | 156/530 |
| 4,897,138 A | 1/1990 | Shaposka et al. | |
| 4,927,474 A * | 5/1990 | Pawloski | 156/66 |
| 4,961,302 A * | 10/1990 | Davis | 53/451 |
| 5,379,572 A | 1/1995 | Giovannone | |
| 5,397,407 A | 3/1995 | D'Addario | |
| 5,463,851 A | 11/1995 | Nagai | |
| 5,780,073 A * | 7/1998 | Chen et al. | 425/289 |
| 6,170,238 B1 | 1/2001 | Lerner | |
| 6,212,861 B1 | 4/2001 | Tsuruta | |
| 6,550,513 B2 * | 4/2003 | Boss | 156/498 |
| 6,739,367 B1 * | 5/2004 | Totani | 156/498 |
| 6,913,056 B2 * | 7/2005 | Landherr et al. | 156/378 |
| 2004/0217100 A1 * | 11/2004 | Ogimoto et al. | 219/243 |

OTHER PUBLICATIONS

Wave Biotech LLC; Hot Lips Tube Sealer; http://www.wavebiotech.com/products/hot_lips; viewed Jul. 8, 2004; (2 pages).

Consolidated Polymer Technologies, Inc.; Products and Services—C-Flex® Tubing Products; http://www.c-flex-cpt.com/prodserv3.html; viewed Jul. 8, 2004 (3 pages).

* cited by examiner

THERMOPLASTIC TUBE SEALING DEVICE UTILIZING ACTUATORS TO CONTROL SEPARATE HEATING AND COOLING STATIONS

CROSS-REFERENCE TO RELATED APPLICATIONS

This application claims the benefit of U.S Provisional Patent Application No. 60/590,123, filed Jul. 22, 2004.

BACKGROUND

The invention relates to tube sealing devices and more particularly to tube sealing devices for sealing flexible tubing.

Known tube sealing devices are used to seal flexible tubing. As one example, the sealing device is used to seal flexible tubing used in a disposable manifold system of a filling apparatus. Filling apparatus are commonly used in pharmaceutical, biomedical, chemical, and food packaging industries. The disposable manifold system includes multiple containers, typically bags, connected by a series of respective, discrete fill tubes that branch off from a main supply tube. The main supply tube is connected to a reservoir containing a fluid. After the manifold system is connected to the reservoir, fluid is pumped from the reservoir into the main supply tube, through the fill tubes, and into the bags thereby filling the bags with fluid. The bags can be filled simultaneously or sequentially with the use of clamps or valves to selectively direct flow through only desired fill tubes and desired portions of the main supply tube. After a bag is filled, it is removed from the manifold system by heat sealing the corresponding fill tube and then cutting the fill tube from the manifold system at a location above the seal. Manifold systems are disposable to avoid the cleaning, sterilizing, and validating issues prevalent when using non-disposable fill systems.

Generally, tube sealing devices include a sealing tool that is positioned on a pneumatic press for manipulation of the sealing tool between open and closed positions. In the open position, upper and lower heads are positioned adjacent each other and in the closed position, the upper and lower heads are separated a greater distance from each other. Each of the upper and lower heads is capable of being alternately heated and cooled.

To seal a tube, flexible tubing is positioned across the sealing tool when the tool is in the open position. The upper and lower heads are heated to an elevated temperature and then the press moves the heads to the closed position to sandwich a portion of the tube between the heads. The upper and lower heads transfer heat and apply pressure to the portion of the tube in contact with the heads. After a time sufficient to allow the heat of the heads to pass through the sandwiched portion of the tube, the upper and lower heads no longer generate heat and begin to cool, either with active or passive cooling, while remaining in contact with the tube. As the tube cools with the upper and lower heads, the inside walls of the heated portion of the tube bond together thereby creating a seal in the tube. Once adequately cooled, the press opens the tool to separate the heads allowing the sealed tube to be removed from the tool. The seal in the tube restricts flow through the tube.

SUMMARY

In one embodiment, the invention provides a tube sealing device that improves cycle times necessary to seal a tube by providing separate tools for heating and cooling the tube. In one embodiment, the tube sealing device includes heating tools and cooling tools that each move between open and closed positions. In some embodiments, the tools are movable to allow both the heating and cooling tools to separately contact the same portion of the tube. In other embodiments, the tube is movable to position the same portion of the tube adjacent separate heating and cooling tools.

In some constructions, the tools are movable between lowered and raised positions relative to a base. The base includes upper and lower clamps that are controllable between open and closed positions to hold the tube in position relative to the tools. The tools can be mounted to a carrier that is actuated by an air cylinder to move between different positions.

In yet other embodiments, the tools can be mounted to rotating paddles, discs, or drums such that after the heating tools are opened from the closed position, the paddles, discs, or drums are rotated to position the cooling tools adjacent to the tubing and the heating tools away from the tubing. In this position, the cooling tools can be closed to cool and set the pinched portion of the tubing. After the cooling tools are opened and the tubing is removed, the paddles, discs, or drums are rotated back to again position the heating tools adjacent a newly inserted length of tubing. In yet other embodiments, the heating and cooling tools can each pivot between open and closed positions to make contact with the same portion of the tubing.

Another embodiment of the invention includes a method of sealing a tube using a tube sealing device including positioning a discrete piece or length of flexible tubing within the tube sealing device, closing the heating tools to pinch and heat a portion of the tubing, opening the heating tools, aligning the cooling tools with the pinched portion of the tubing, closing the cooling tools to pinch and cool the pinched portion of the tubing, opening the cooling tools, and removing the sealed tubing. In some embodiments, the method includes holding the tubing in position using clamps positioned on opposite sides of the pinched portion. In alternate embodiments, the method includes moving the tubing after the central portion is heated to align the pinched portion with the cooling tool.

Other features and advantages of the invention will become apparent to those skilled in the art upon review of the following detailed description, claims, and drawings.

Figure 1:
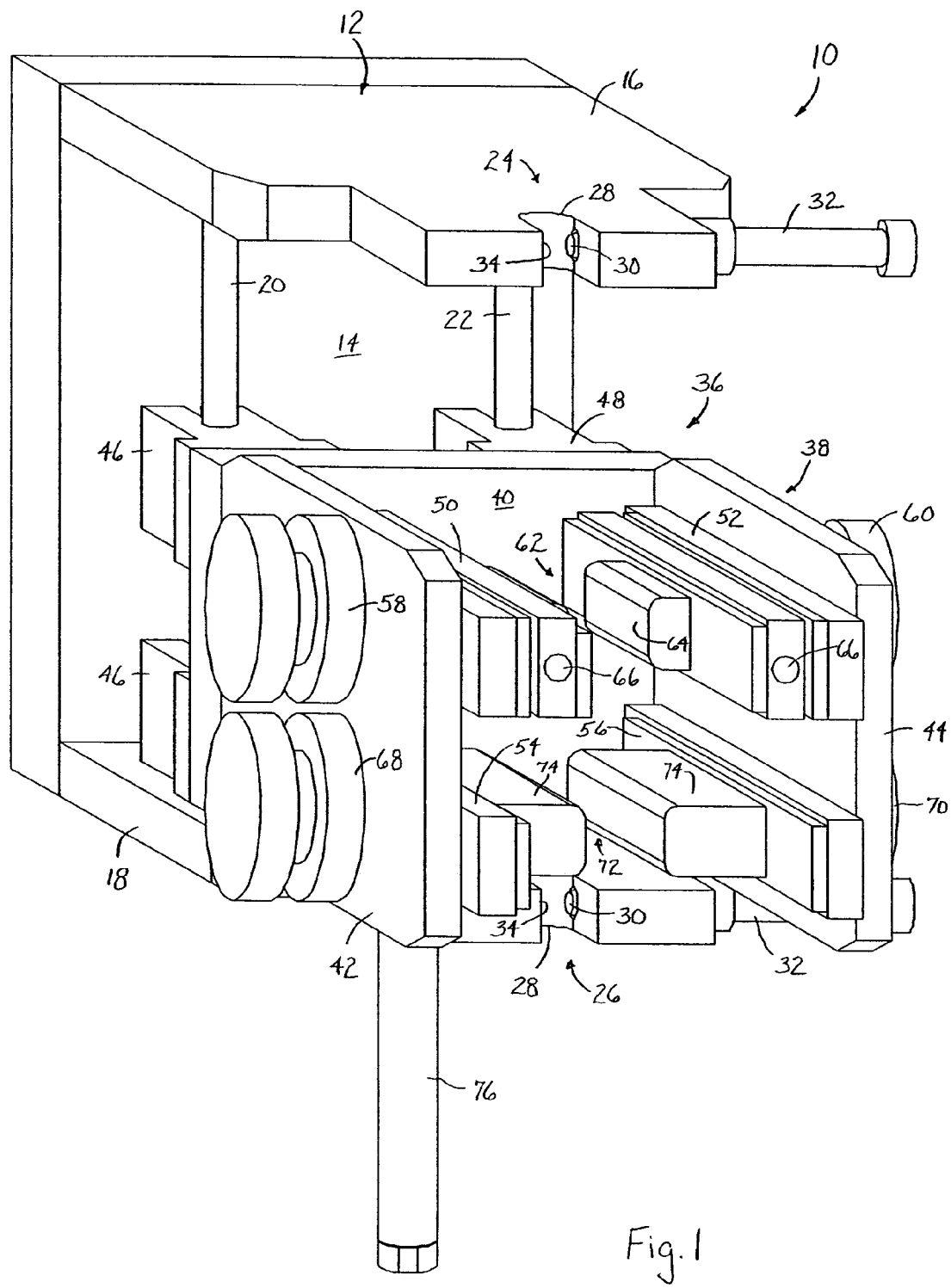
FIG. 1 is a perspective view of a tube sealing device according to one embodiment of the present invention, illustrating heating and cooling tools that are vertically movable.
Figure 2:
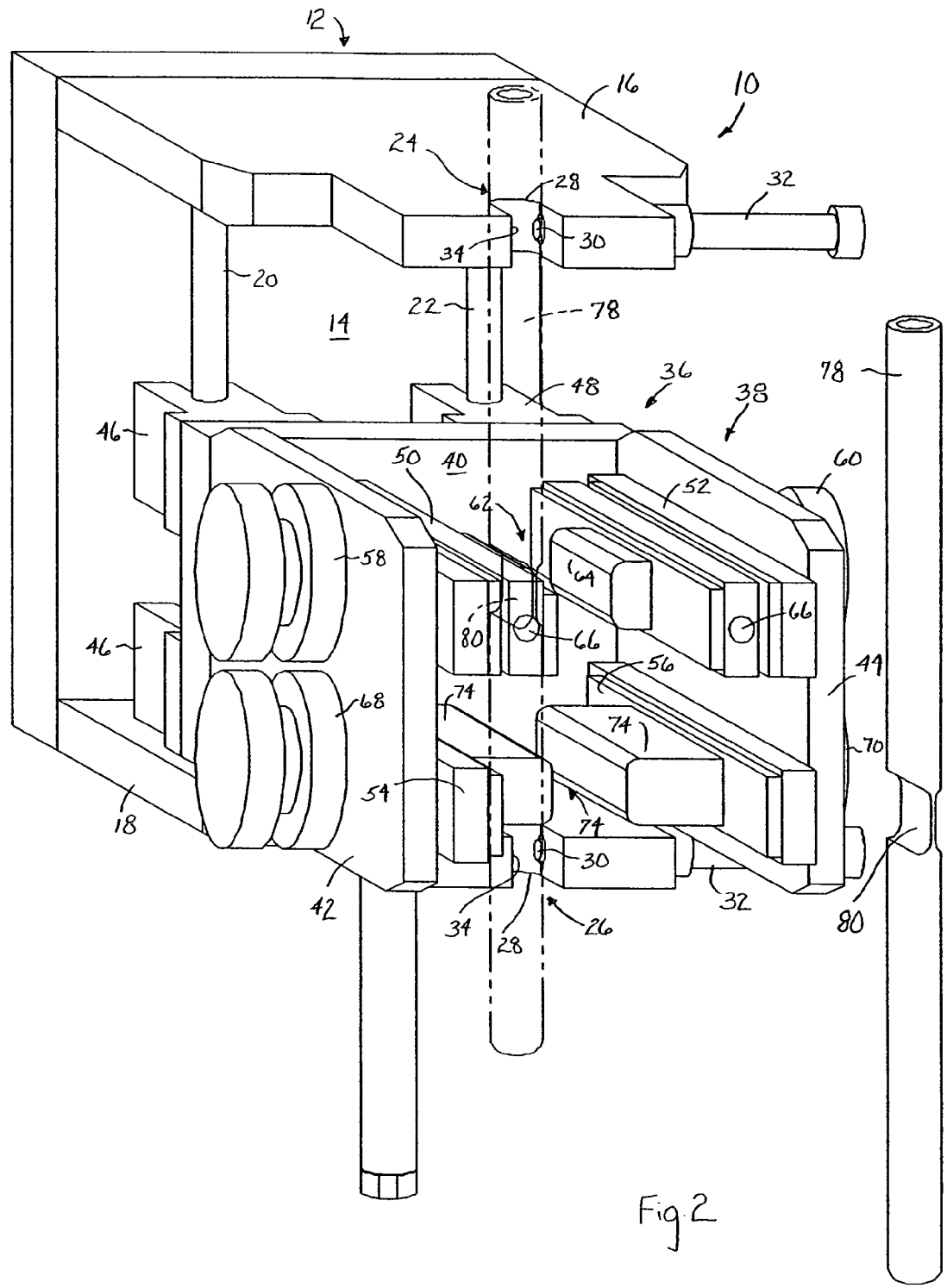
FIG. 2 is a view similar to FIG. 1, illustrating a sealed tube removed from the tube sealing device.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of letters to identify elements of a method or process is simply for identification and is not meant to indicate that the elements should be performed in a particular order.

DETAILED DESCRIPTION

FIGS. 1-12 illustrate a tube sealing device 10 according to one embodiment of the present invention. The tube sealing device 10 includes a base 12. The base 12 can be supported by a frame or can otherwise be uncoupled to a support structure to facilitate use of the tube sealing device 10 in hand-held operations. The base 12 is generally C-shaped and includes a rear support 14 and upper and lower supports 16, 18 each connected to a respective end of the rear support 14 in a generally cantilevered manner. The upper and lower supports 16, 18 extend from the rear support 14 in the same direction. The base 12 also includes two rods 20, 22 that extend between the upper and lower supports 16, 18.

The upper and lower supports 16, 18 include upper and lower clamps 24, 26, respectively. The upper and lower clamps 24, 26 are substantially identical and therefore only the upper clamp 24 is described in detail. The clamp 24 is defined by a notch 28 within the support 16 , a rod 30 slidably positioned within a hole in the support 16, and a clamp actuator 32 coupled to the rod 30 and the support 16. The clamp actuator 32 is controllable to move the rod 30 between extended and retracted positions. In the retracted position, the rod 30 is withdrawn from or partially exposed within the notch 28. In the extended position, the rod 30 is further exposed within the notch 28 and can be capable of extending into contact and applying a pressure against an opposing wall 34 of the notch 28. The clamp actuator 32 can be a pneumatic or hydraulic piston/cylinder assembly.

Although terms indicating orientation such as upper, lower, top, bottom, right, and left may be used throughout the specification with reference to the illustrated embodiments, the invention should not be limited to a tube sealing device 10 operable in only these orientations. Rather, the tube sealing device 10 can be used in any desired orientation besides vertical, such as horizontal, or any other angled position relative to vertical.

The tube sealing device 10 also includes a sealing tool 36. The sealing tool 36 includes a generally C-shaped carrier 38 having a rear wall 40 and two side walls 42, 44. Each side wall 42, 44 is connected to a respective end of the rear wall 40 in a generally cantilevered manner. The side walls 42, 44 extend from the rear wall 40 in the same direction. Bearings 46, 48 are mounted to the rear wall 40 and project in a direction opposite to the side walls 42, 44. Two of the bearings 46 are vertically aligned along one side of the rear wall 40 and are slidably coupled a respective rod 20, and the other two bearings 48 are vertically aligned along the opposite side of the rear wall 40 and are slidably connected to the other rod 22. In this manner, the bearings 46, 48 and the carrier 38 are vertically movable relative to the base 12.

The sealing tool 36 includes a pair of heating tools 50, 52 and a pair of cooling tools 54, 56. The heating tools 50, 52 are mounted to the carrier 38 such that the heating tools 50, 52 are in facing relationship to each other. The heating tool 50 is coupled to a tool actuator 58 that is coupled to the side wall 42. Likewise, the other heating tool 52 is coupled to a tool actuator 60 that is coupled to the opposite side wall 44. The tool actuators 58, 60 are controllable to move the heating tools 50, 52 relative to the side walls 42, 44 of the carrier 38 between open and closed positions. The tool actuators 58, 60 can be a pneumatic or hydraulic piston/cylinder assemblies. In the open position, the heating tools 50, 52 are separated from each other such that a gap 62 or clearance is present between the tools 50, 52. In the closed position, the heating tools 50, 52 are positioned closer together. In some embodiments, the heating tools 50, 52 can contact each other, unless otherwise obstructed, and apply forces against each other. Contact elements 64 of the tools 50, 52 are generally rectangular with filleted edges. Each heating tool 50, 52 includes a heating element 66 that is controllable to selectively apply heat to the tool 50, 52. For example, the heating element 66 can be a heating electrode positioned within the tool 50, 52. In other embodiments, only one of the pair of heating tools 50, 52 is heated.

The cooling tools 54, 56 are also mounted to the carrier 38 such that the cooling tools are in facing relationship to each other. The cooling tool 54 is coupled to a tool actuator 68 that is coupled to the side wall 42. Likewise, the other cooling tool 56 is coupled to a tool actuator 70 that is coupled to the opposite side wall 44. The tool actuators 68, 70 can be a pneumatic or hydraulic piston/cylinder assembly. The tool actuators 68, 70 are controllable to move the cooling tools 54, 56 relative to the side walls 42, 44 of the carrier 38 between open and closed positions. In the open position, the cooling tools 54, 56 are separated from each other such that a gap 72 or clearance is present between the tools 54, 56. In the closed position, the cooling tools 54, 56 are positioned closer together. In some embodiments, the cooling tools 54, 56 can contact each other, unless otherwise obstructed, and apply forces against each other. Contact elements 74 of the tools 54, 56 are generally rectangular with filleted edges. Each cooling tool 54, 56 can include a controllable cooling system 75 (FIG. 16) to actively remove heat from the tool 54, 56. For example, the cooling system 75 can include a vortex cooler, a temperature controlled water or glycol cooling system, or the like. In other embodiments, each cooling tool 54, 56 can be passively cooled by allowing the heat to transfer to the surrounding environment. For example, the cooling tools 54, 56 can be cooled by allowing the temperature of the tools to gradually reach room temperature or by controllable fans to increase the rate at which the temperature of the tools 54, 56 is returned to ambient. In other embodiments, only one of the pair of cooling tools 54, 56 is actively cooled.

A carrier actuator 76 is coupled to the lower support 18 and to the carrier 38. The carrier actuator 76 is controllable to move the carrier 38 relative to the base 12 between raised and lowered positions. The carrier actuator 76 can be a pneumatic or hydraulic piston/cylinder assembly, a servomotor/lead screw, stepper or electric motor, belt pulley or conveyor, rack and pinion, mechanical lever, linear actuator, gearbox, solenoid, or any combination thereof.

Figure 16:
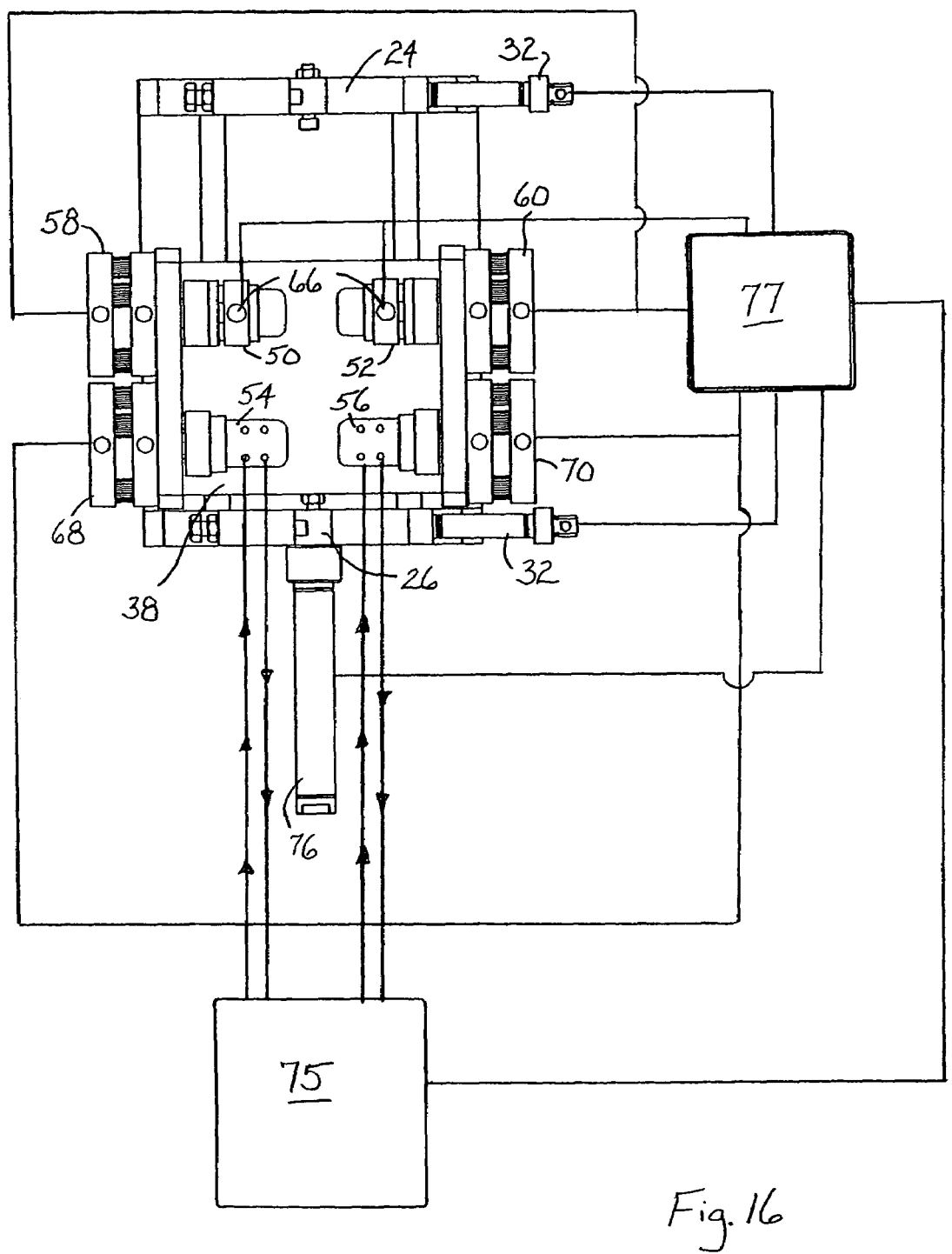
FIG. 16 is a schematic view of the tube sealing device of FIG. 1, illustrating a controller.

As shown schematically in FIG. 16, the tube sealing device 10 also includes a controller 77 that is electronically coupled to the clamp actuator 32, the tool actuators 58, 60, 68, 70, and the carrier actuator 76 to control the movement of the clamps 24, 26, tools 50, 52, 54, 56, and carrier 38, respectively. The controller 77 is also electrically coupled to the heating elements 66 and cooling system 75 to control the temperature of the tools 50, 52, 54, 56. The controller 77 can also be electrically connected to a series of sensors (such as temperature and pressure sensors) which provide signals to the controller 77 representative of conditions of the tube sealing device 10. Also, the controller 77 can include a program which controls the operation of the tube sealing device 10.

Figure 3:
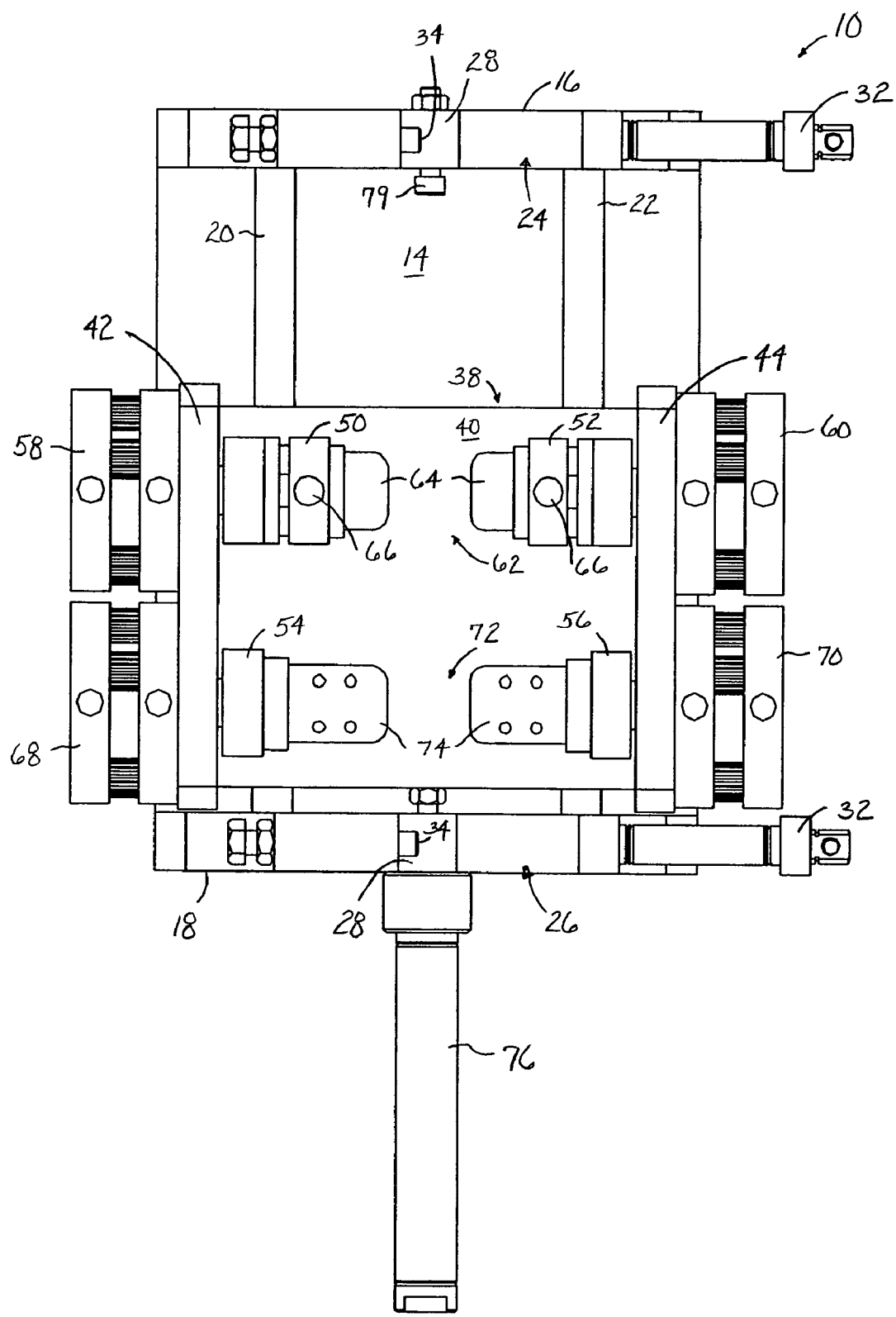
FIG. 3 is a front view of the tube sealing device shown in FIG. 1, illustrating the tube sealing device in an idle condition.

The operation of the tube sealing device 10 is illustrated in FIGS. 3-13. FIG. 3 illustrates the tube sealing device 10 in the idle condition ready to receive a tube 78 for sealing. The tube 78 can be a flexible, resilient tube made from plastic materials such as polyethylene, polypropylene, ethylene vinyl acetate, polyolefins, Nylon, a thermo plastic elastomer, or combination of the above resins. The tube 78 can include a wall thickness of at least 0.0625", and more specifically, between 0.0625"-0.125". In addition, other heat sealable resins can be used. The tube 78 is preferably a discrete piece of resilient tube, for example, it may be one of several spaced discrete vertically oriented pieces of resilient tubing connected by a horizontally disposed manifold as used in the filling of aseptic containers such as intravenous bags. Alternatively, the discrete piece of tubing could be the fill tube for one of a plurality of separate containers that are being serially filled. In the idle condition, the clamps 24, 26, the heating tools 50, 52, and the cooling tools 54, 56 are in the open positions. At this time, or anytime prior to the moving the heating tools 50, 52 to the closed position, the heating tools 50, 52 are heated by the heating elements 66 to a desired temperature. In most applications, the desired temperature of the tools 50, 52 is between 250-280 degrees Fahrenheit. In other embodiments, the temperature can be greater or less then this range.

Figure 4:
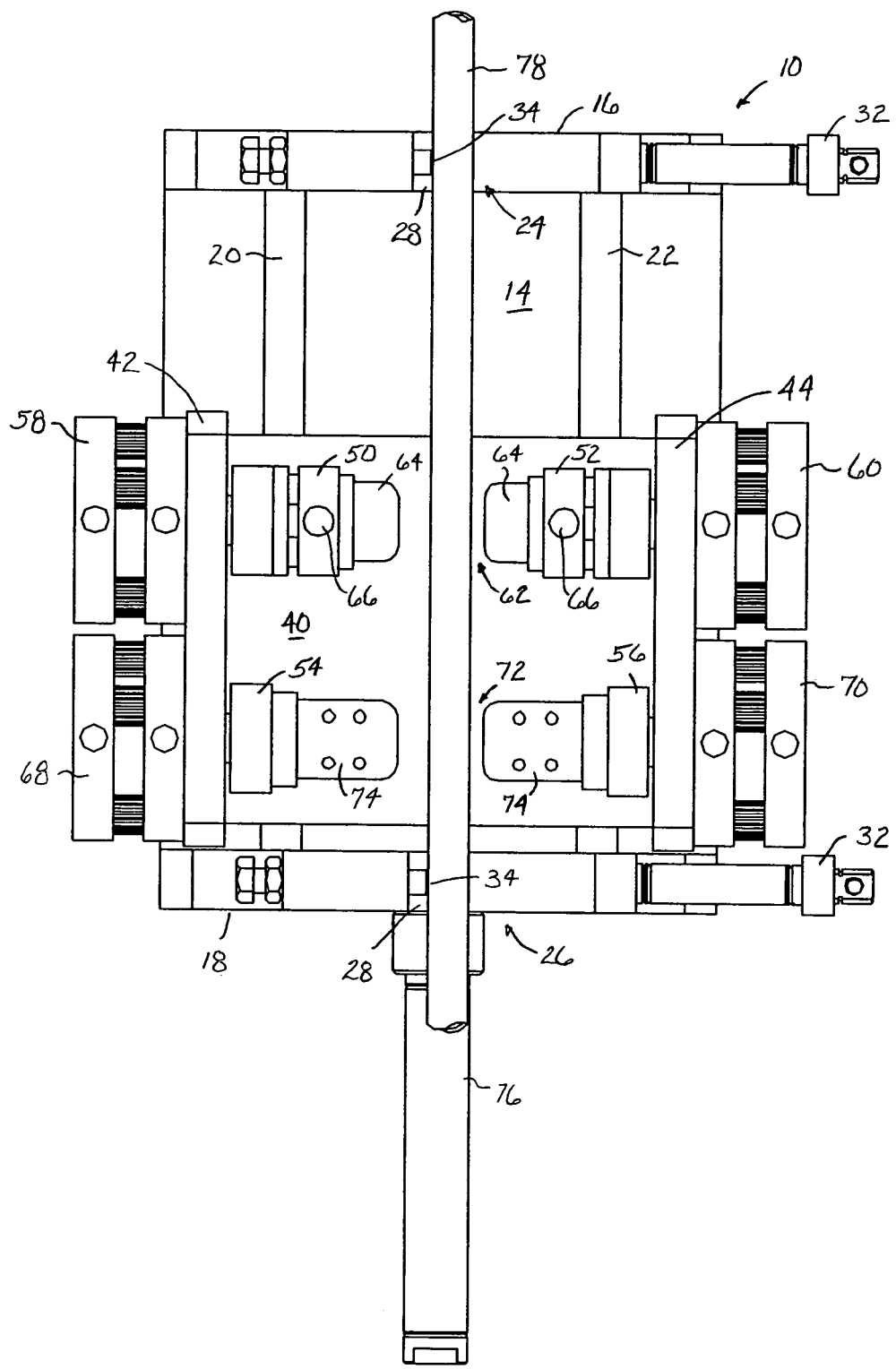
FIG. 4 is a view similar to FIG. 3, illustrating a tube inserted into the tube sealing device.
Figure 5:
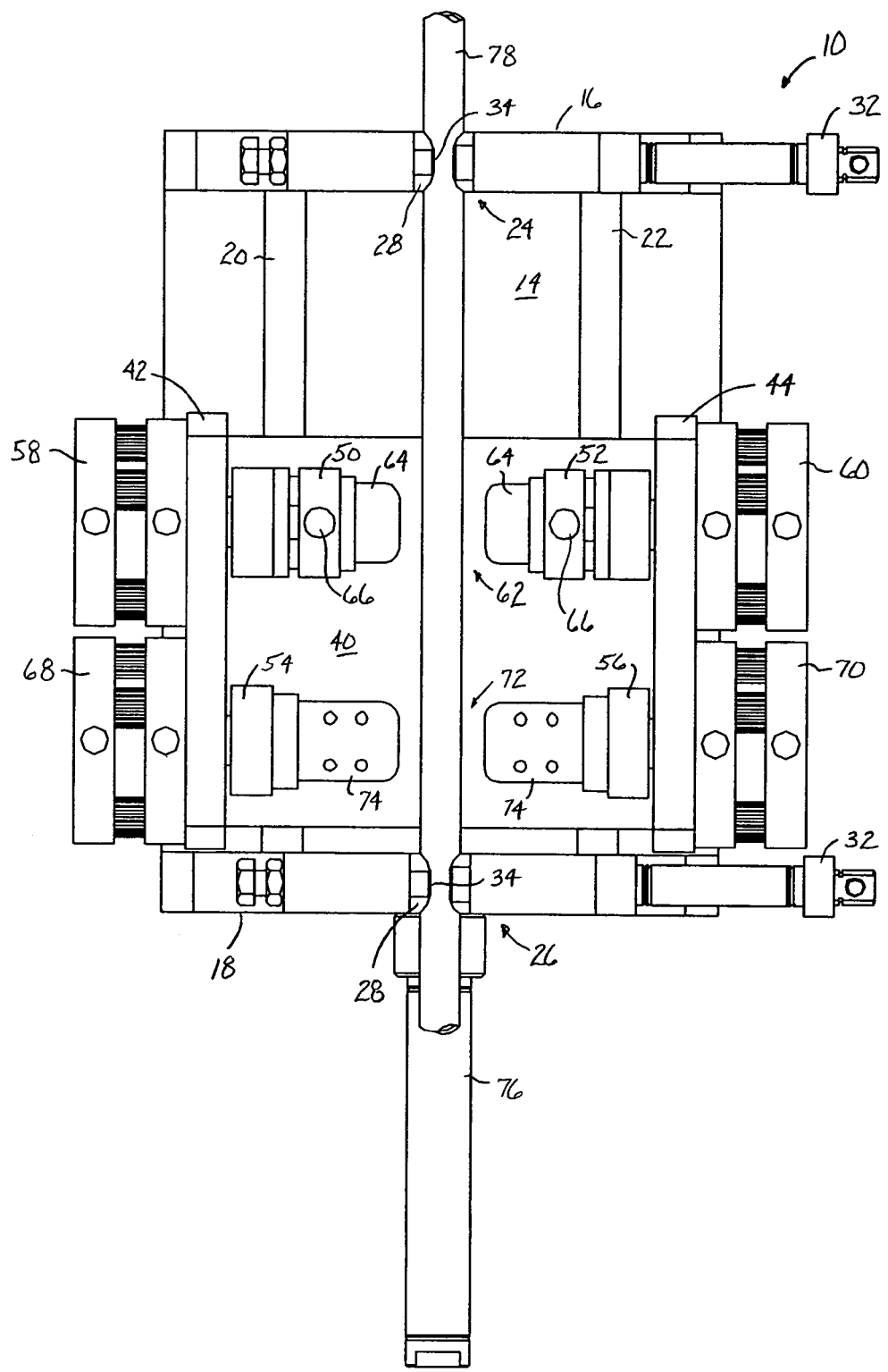
FIG. 5 is a view similar to FIG. 3, illustrating clamps in a closed position.

When the tube sealing device 10 is in the idle condition, ends of a tube 78 can be inserted into the notches 28 of the upper and lower supports 16, 18 and a central portion 80 can be positioned between the tools 50, 52 as shown in FIG. 4. The tube 78 can be inserted manually or by an automated placement system (FIG. 5). The controller 77 then sends a signal to the actuators 32 to move the rods 30 into the extended position thereby pinching each end of the tube 78 between the rod 30 and the notch wall 34. The pinching of the tube 78 restricts the movement of the tube 78 as the tube 78 is being sealed.

Figure 6:
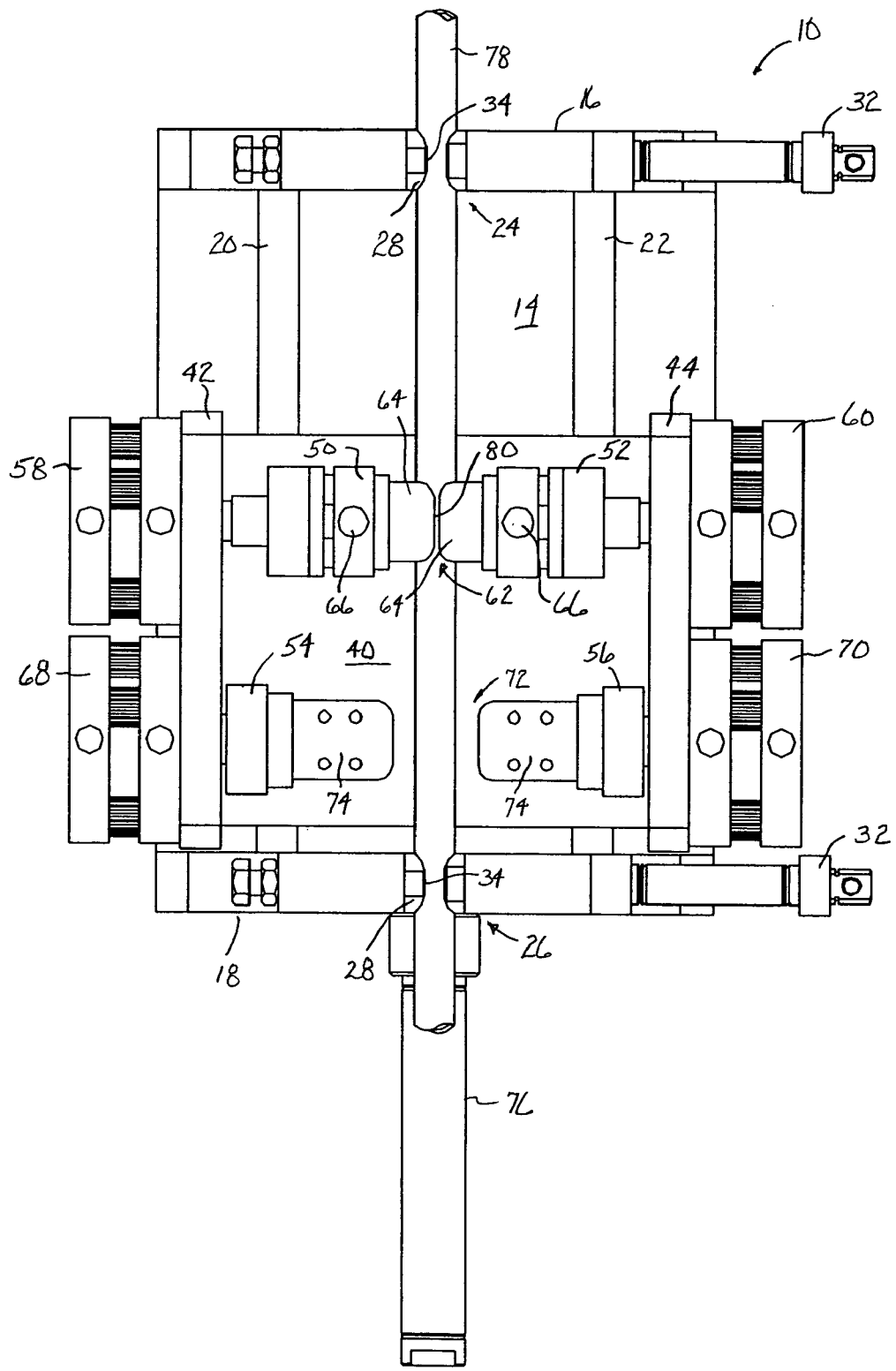
FIG. 6 is a view similar to FIG. 3, illustrating heating tools in a closed position.

With reference to FIG. 6, the controller 77 sends a signal to the tool actuators 58, 60 to move the heating tools 50, 52 to the closed position. In some embodiments, the controller 77 will wait to actuate the tools 50, 52 until the temperature of the heating tools 50, 52 is within the desired range. In the closed position, the contact elements 64 pinch the portion 80 of the tube 78 and heat that portion 80 of the tube 78. The pressure applied to the tube 78 by the contact elements 64 is enough to bring the internal walls of the tube 78 together. The dwell time of the heating tools 50, 52 (i.e., the time the heating tools 50, 52 remain closed on the tube 78) is within the range of 1-60 seconds, and preferably within the range of 10-50 seconds. The tool temperature, pressure, and dwell time are dependent upon the size and material of the tube 78.

Figure 7:
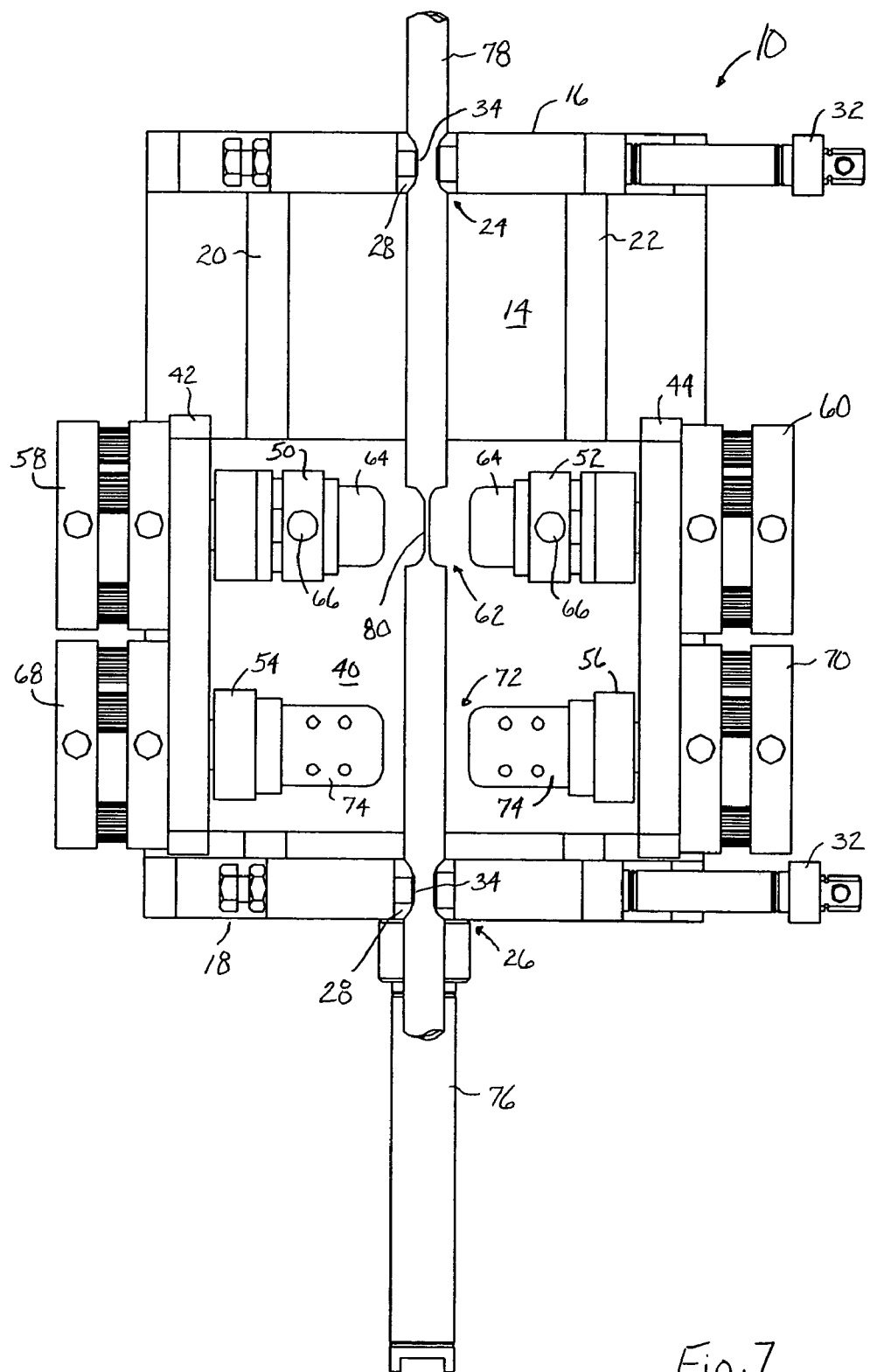
FIG. 7 is a view similar to FIG. 3, illustrating the heating tools in an open position.

After a sufficient amount of time to thoroughly heat the tube 78 at the pinched portion 80, the controller 77 sends a signal to the tool actuators 58, 60 to move the heating tools 50, 52 to the open position (FIG. 7). As shown, when the tools 50, 52 are opened, a pinch form remains in the tube 78 from the force and heat of the heating tools 50, 52. However, some tube types can exhibit resiliency tending to open the pinched portion 80 to return it to its original shape after the heating tools 50, 52 are removed. The pinched portion 80 is considered to be opened when the inner walls of the tube move out of contact with each other to form a space or gap between the inner walls.

Figure 8:
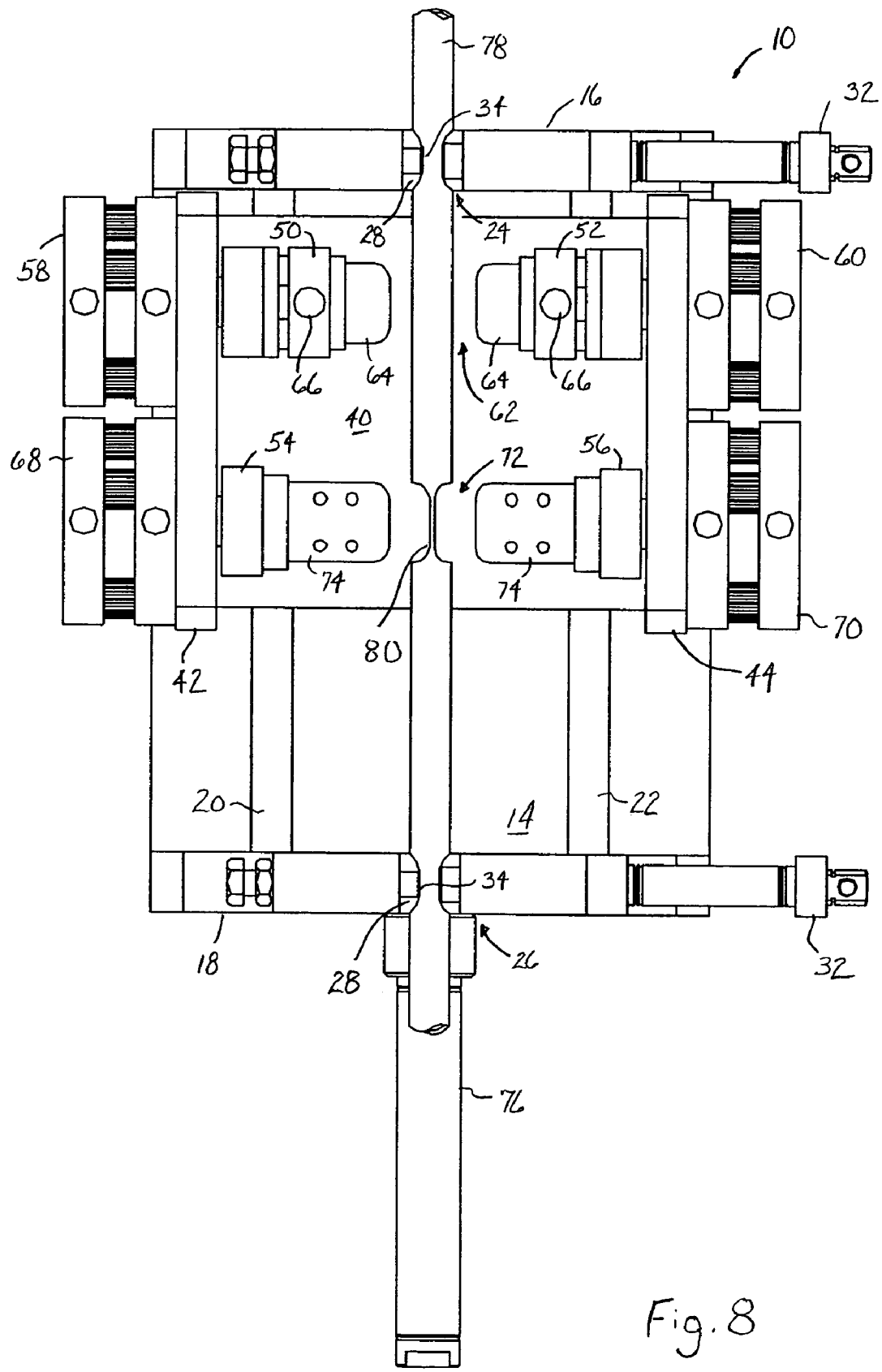
FIG. 8 is a view similar to FIG. 3, illustrating a tool carrier in a raised position.
Figure 15:
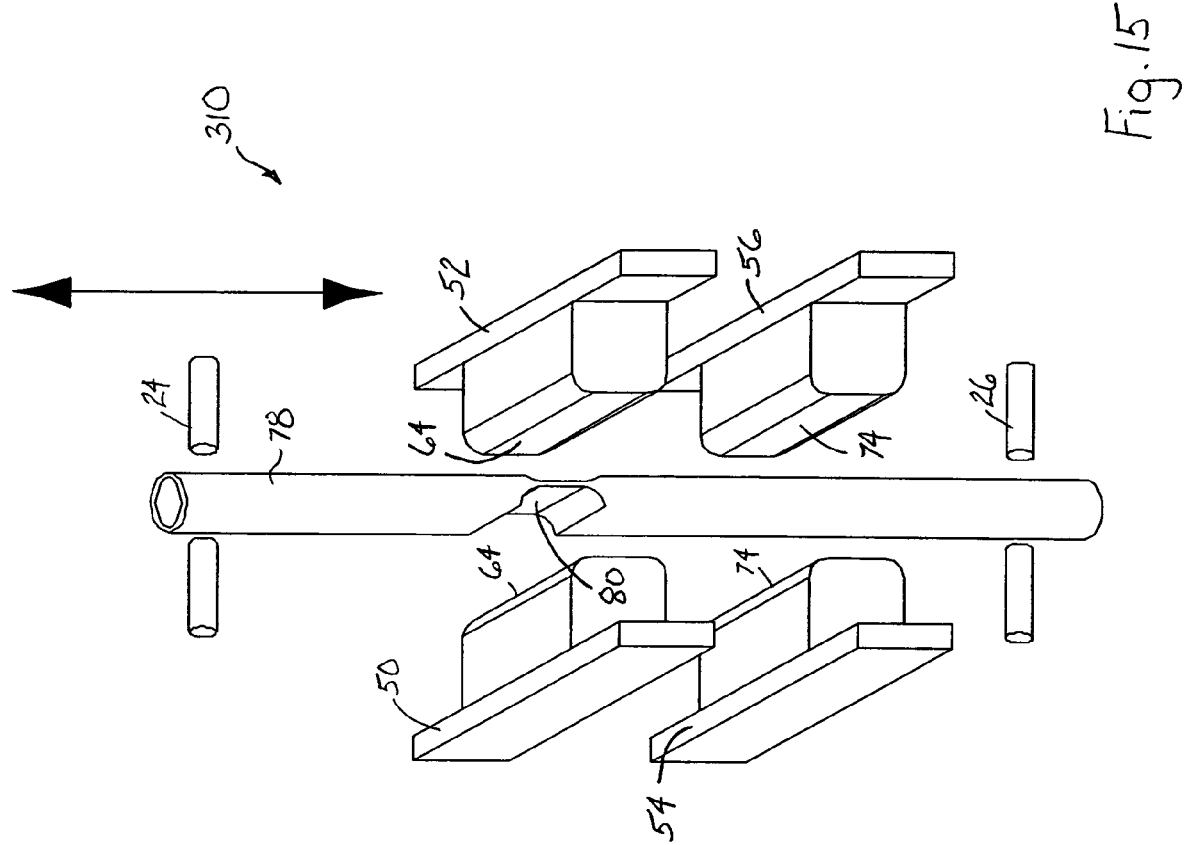
FIG. 15 is a schematic view of a tube sealing device according to another embodiment of the invention, illustrating a tube that is vertically movable.

As shown in FIG. 8, the controller 77 sends a signal to the carrier actuator 76 to move the carrier 38 from the lowered position to the raised position. A stop 79 of the upper support 16 (FIG. 3) limits the movement of the carrier 38 beyond the raised position. The stop 79 is adjustable to vary the raised position. A similar stop 79 is also positioned on the lower support to define and vary the lowered position. In the raised position, the cooling tools 54, 56 are aligned with the pinched portion 80 of the tube 78. Other embodiments allowing change to the relative position between the tube 78 and the tools 50, 52, 54, 56 are within the scope of the present invention. For example, tube sealing device 310 of FIG. 15, the tube 78 instead can be repositioned to align the pinched portion 80 with the cooling tools 54, 56. In yet other embodiments, a combination of movements of the tube 78 and the tools 50, 52, 54, 56 can be used to align the pinched portion 80 with the cooling tools 54, 56.

Figure 9:
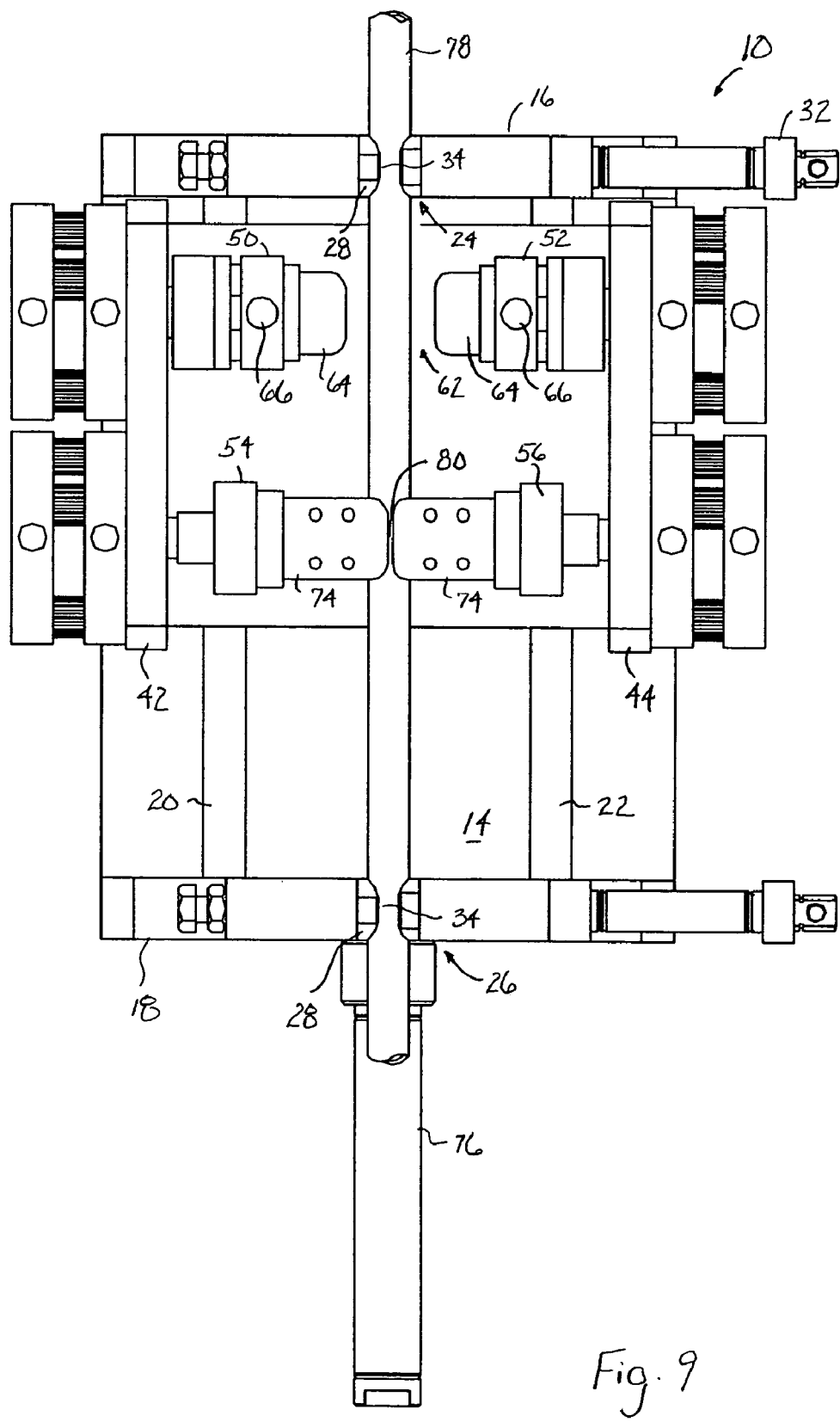
FIG. 9 is a view similar to FIG. 3, illustrating cooling tools in a closed position.

After the tube 78 is aligned, the controller 77 sends a signal to the tool actuators 68, 70 to extend the cooling tools 54, 56 to the closed position (FIG. 9). In the closed position, the cooling tools 54, 56 are positioned in approximately the same position relative to the tube 78 as the heating tools 50, 52. The controller 77 can signal the cooling system to begin cooling at this stage or prior to this stage such that the cooling tools 54, 56 are pre-cooled before contacting the pinched portion 80. The cooling and pressure of the contact elements 74 of the cooling tools 54, 56 allow the pinched portion 80 to fuse together and form a permanent seal. In the cases where the pinched portion 80 has begun to open due to the resiliency of the tube material, the cooling tools 54, 56 re-establish the pinch allowing the heated pinched portion 80 to again fuse together to form a seal. To re-establish the pinch, it is important that the cooling tools 54, 56 contact the pinched portion 80 while sufficiently heated, for example within 3 seconds, and preferably within 2 seconds, after being released from the heating tools 50, 52. In some embodiments, the cooling temperature is approximately 100 degrees Fahrenheit less than the temperature of the heating tools 50, 52. In other embodiments, the temperature of the cooling tools 54, 56 is between approximately 33-70 degrees Fahrenheit. In yet other embodiments, the temperature of the cooling tools 54, 56 is not controlled, but rather determined by the ambient conditions. The dwell time of the cooling tools 54, 56 (i.e., the time the cooling tools 54, 56 remain closed on the tube 78) is within the range of 1-30 seconds, and preferably within the range of 5-15 seconds, with active cooling and generally longer with a passive cooling system. The tool temperature, pressure, and dwell time are dependent upon the size and material of the tube 78.

Figure 10:
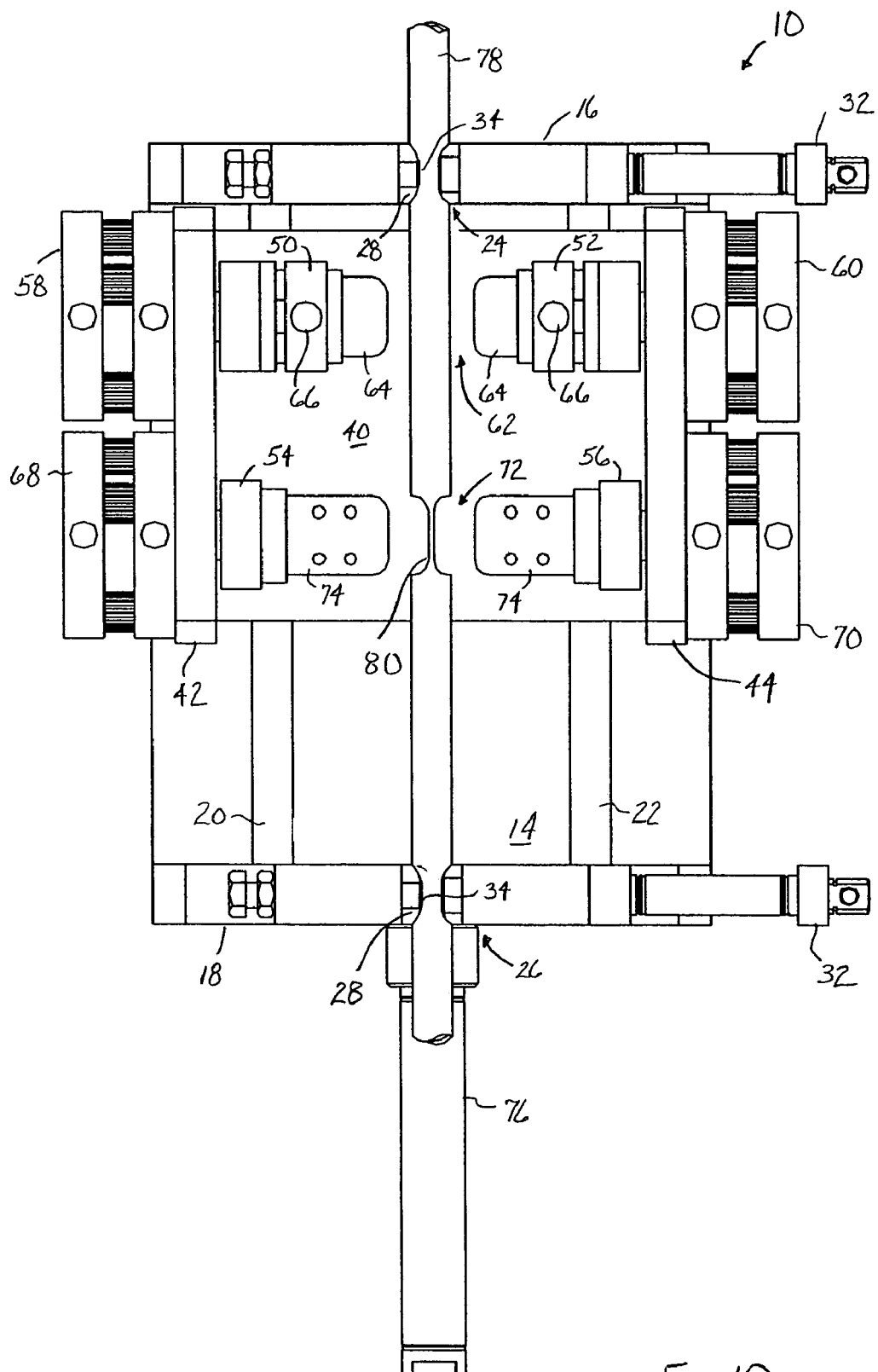
FIG. 10 is a view similar to FIG. 3, illustrating the cooling tools in an open position.
Figure 11:
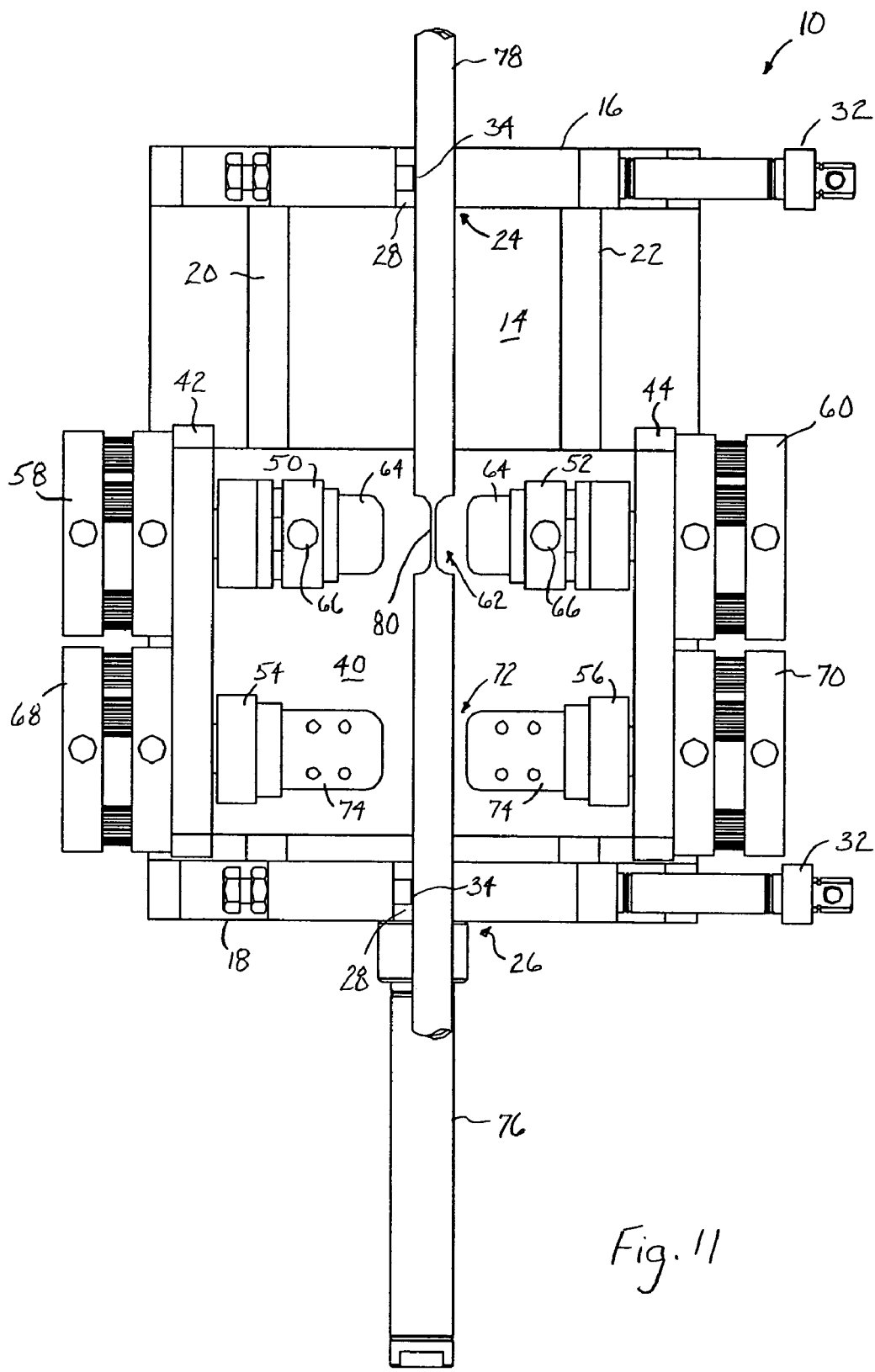
FIG. 11 is a view similar to FIG. 3, illustrating the tool carrier in a lowered position and the clamps in an open position.
Figure 12:
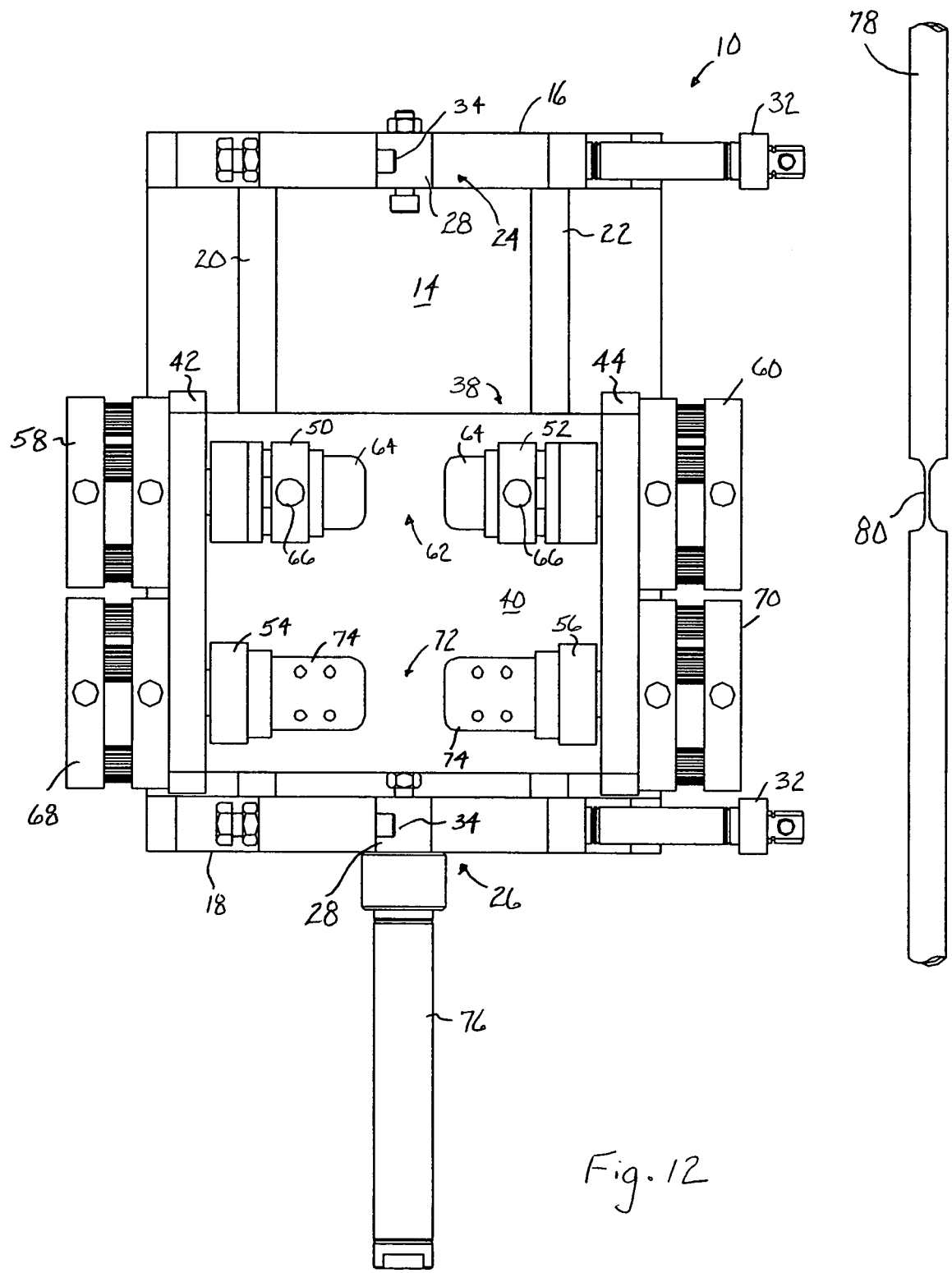
FIG. 12 is a view similar to FIG. 3, illustrating the tube removed from the tube sealing device.

After the pinched portion 80 is thoroughly cooled, the controller 77 sends a signal to the tool actuators 68, 70 to move the cooling tools 54, 56 into the open position (FIG. 10). At this stage the seal is set and prevents fluid flow through the tube 78. The controller 77 then sends a signal to the clamp actuators 32 to open the upper and lower clamps 24, 26 and release the ends of the tube 78 (FIG. 1). Also, the controller 77 sends a signal to the carrier actuator 76 to move the carrier 38 to the lowered position. When the clamps 24, 26 are released, the sealed tube 78 can be removed from the tube sealing device 10 (FIGS. 2 and 12) leaving the tube sealing device 10 in the idle condition to await the loading of a new unsealed tube.

Figure 13:
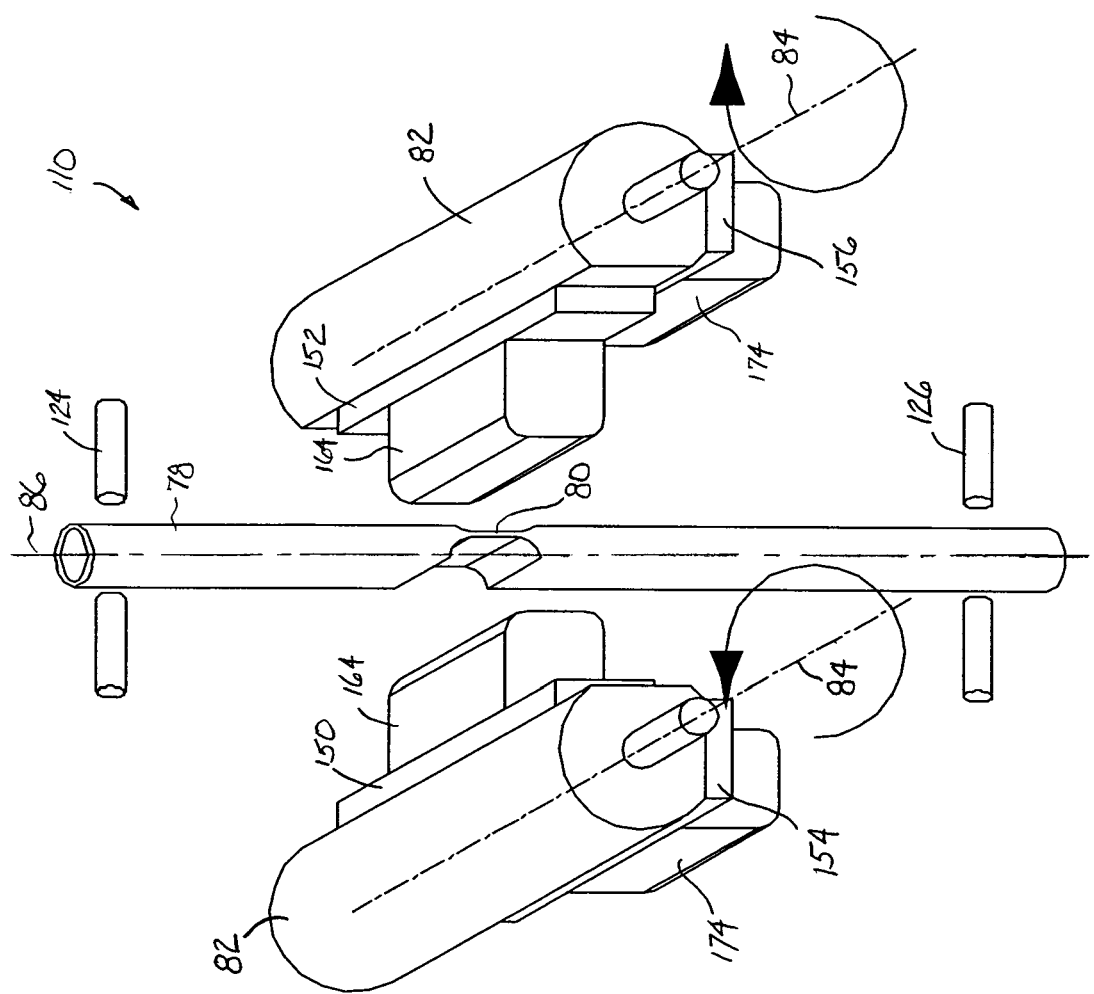
FIG. 13 is a schematic view of a tube sealing device according to another embodiment of the invention, illustrating heating and cooling tools that are rotatable about an axis perpendicular to a longitudinal axis of a tube.

FIG. 13 illustrates another tube sealing device 110 according to another embodiment of the present invention. In this construction, the heating and cooling tools 150, 152, 154, 156 are mounted to drums 82 that are rotatable about an axis 84 that is normal to a longitudinal axis 86 of the tube 78. During operation, the heating tools 150, 152 are positioned in facing relationship with each other and then the drums 82 are moved toward the tube 78 to move the contact elements 164 into contact with the tube 78. After the tube 78 is heated, the drums 82 are moved away from the tube 78 to remove the contact elements 164 from the sealed portion 80 of the tube 78. After the heating tools 150, 152 are retracted, the drums 82 are rotated to position the cooling tools 154, 156 in facing relationship with each other. The drums 82 are then moved toward the tube 78 such that the contact elements 174 of the cooling tools 154, 156 are placed in the pinched portion 80 of the tube 78. After the tube 78 is cooled, the drums 82 are retracted and rotated back to the original position. The tube 78 is then released by the clamps 124, 126 and removed. In other embodiments, the heating and cooling tools 150, 152, 154, 156 on the drums 82 can be positioned 180 degrees apart from each other to give the drums 82 paddle-type appearances.

Figure 14:
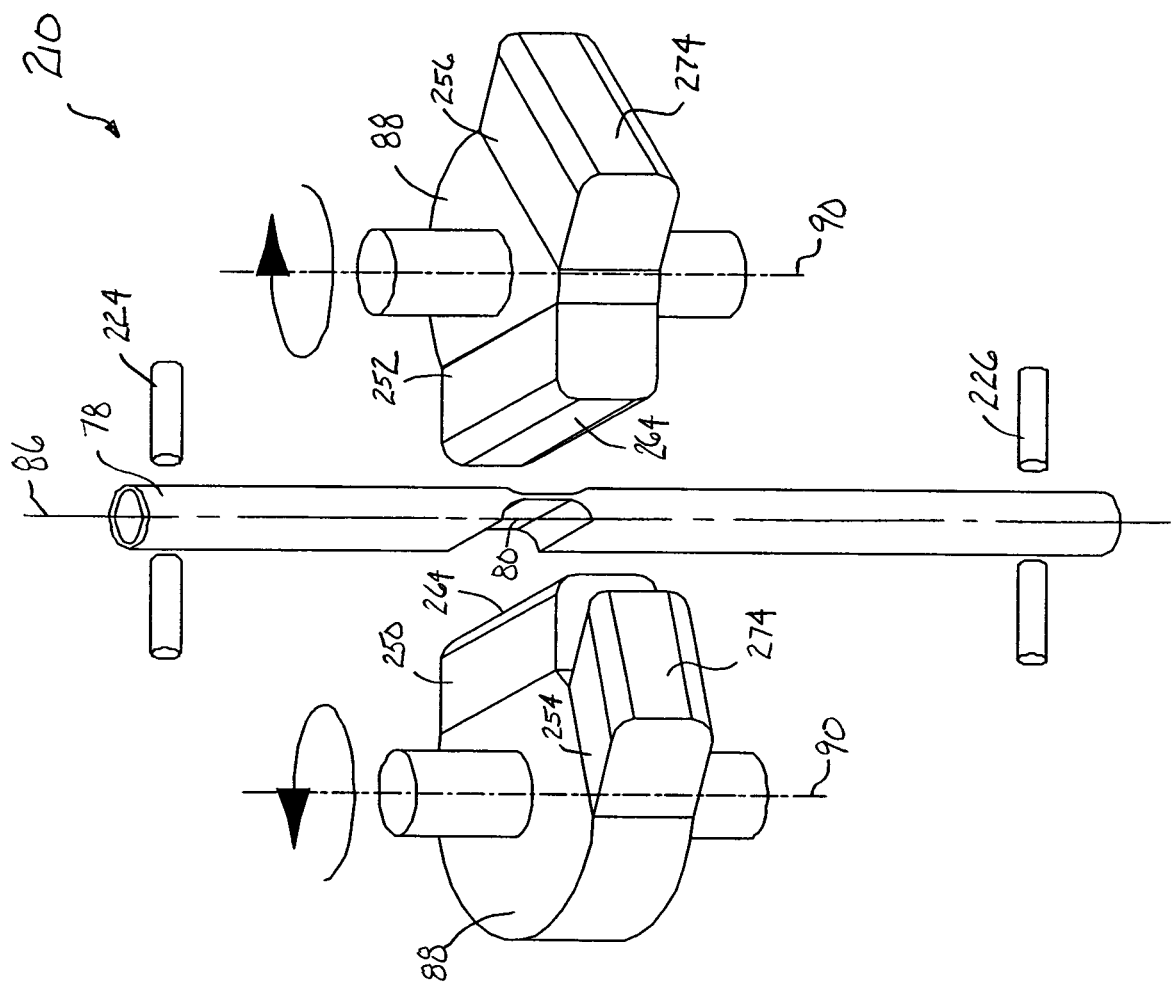
FIG. 14 is a schematic view of a tube sealing device according to another embodiment of the invention, illustrating heating and cooling tools that are rotatable about an axis parallel to a longitudinal axis of a tube.

The tube sealing device 210 of FIG. 14 also embodies the present invention. In this construction, the heating and cooling tools 250, 252, 254, 256 are mounted to discs 88 that are rotatable about an axis 90 that is parallel to the longitudinal axis 86 of the tube 78. During operation, the heating tools 250, 252 are positioned in facing relationship with each other and then the discs 88 are moved toward the tube 78 to move the contact elements 264 into contact with the tube 78. After the tube 78 is heated, the discs 88 are moved away from the tube 78 to remove the contact elements 264 from the sealed portion 80 of the tube 78. After the heating tools 250, 252 are retracted, the discs 88 are rotated to position the cooling tools 254, 256 in facing relationship with each other. The discs 88 are then moved toward the tube 78 such that the contact elements 274 of the cooling tools 254, 256 are placed in the pinched portion 80 of the tube 78. After the tube 78 is cooled, the discs 88 are retracted and rotated back to the original position. The tube 78 is then released by the clamps 224, 226 and removed.

Although not specifically illustrated, there exist many other ways of using separate heating and cooling tools that can be used separately to heat and cool the tube. For example, heating and cooling tools can be positioned on pivoting arms such that to heat the tube the heating tools are pivoted into a closed position about the tube and to cool the tube the cooling tools are pivoted into a closed position about the tube. In yet other embodiments, only one tool of a pair of tools can be actuated. For example, one of the tools can move into contact with a corresponding stationary tool.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A tube sealing device comprising:
   a base configured to support a discrete piece of resilient thermoplastic tube in a substantially fixed position relative to the base;
   a heating tool coupled to the base, the base and heating tool coupled for relative movement to each other, wherein relative movement between the heating tool and the base aligns the heating tool with a portion of the resilient thermoplastic tube, the heating tool operable to contact, pinch and heat the portion of the resilient thermoplastic tube;
   a cooling tool coupled to the base, the base and cooling tool coupled for relative movement to each other, wherein relative movement between the cooling tool and the base aligns the cooling tool with the portion of the resilient thermoplastic tube, the cooling tool operable to contact, pinch and cool the portion of the resilient thermoplastic tube to form a seal;
   wherein the base supports the resilient thermoplastic tube in a substantially fixed position relative to the base as the heating tool heats the portion of the resilient thermoplastic tube until and as the cooling tool cools the portion of the resilient thermoplastic tube;
   a carrier movably coupled to the base, wherein the heating tool is coupled to the carrier for movement with the carrier and relative to the carrier, and wherein the cooling tool is coupled to the carrier for movement with the carrier and relative to the carrier;
   a carrier actuator coupled between the carrier and the base and actuable to move the carrier between a first position and a second position;
   wherein the heating tool is configured to be aligned with a portion of the resilient thermoplastic tube in the first position, the heating tool operable to contact and heat the portion of the resilient thermoplastic tube when the carrier is in the first position; and
   wherein the cooling tool is configured to be aligned with the portion of the resilient thermoplastic tube in the second position, the cooling tool operable to contact and cool the portion of the resilient thermoplastic tube when the carrier is in the second position.

2. The tube sealing device of claim 1, wherein the base includes a first support and a second support, the first support limiting the movement of the carrier to define the first position and the second support limiting the movement of the carrier to define the second position.

3. The tube sealing device of claim 2, wherein each of the first and second supports includes a stop, the stop of the first support contacting the carrier in the first position and the stop of the second support contacting the carrier in the second position.

4. The tube sealing device of claim 3, wherein the stop of the first support is adjustable to adjust a location of the first position and the stop of the second support is adjustable to adjust a location of the second position.

* * * * *